July 31, 1934. M. COUSIN 1,968,439
GEARING
Filed Jan. 10, 1929
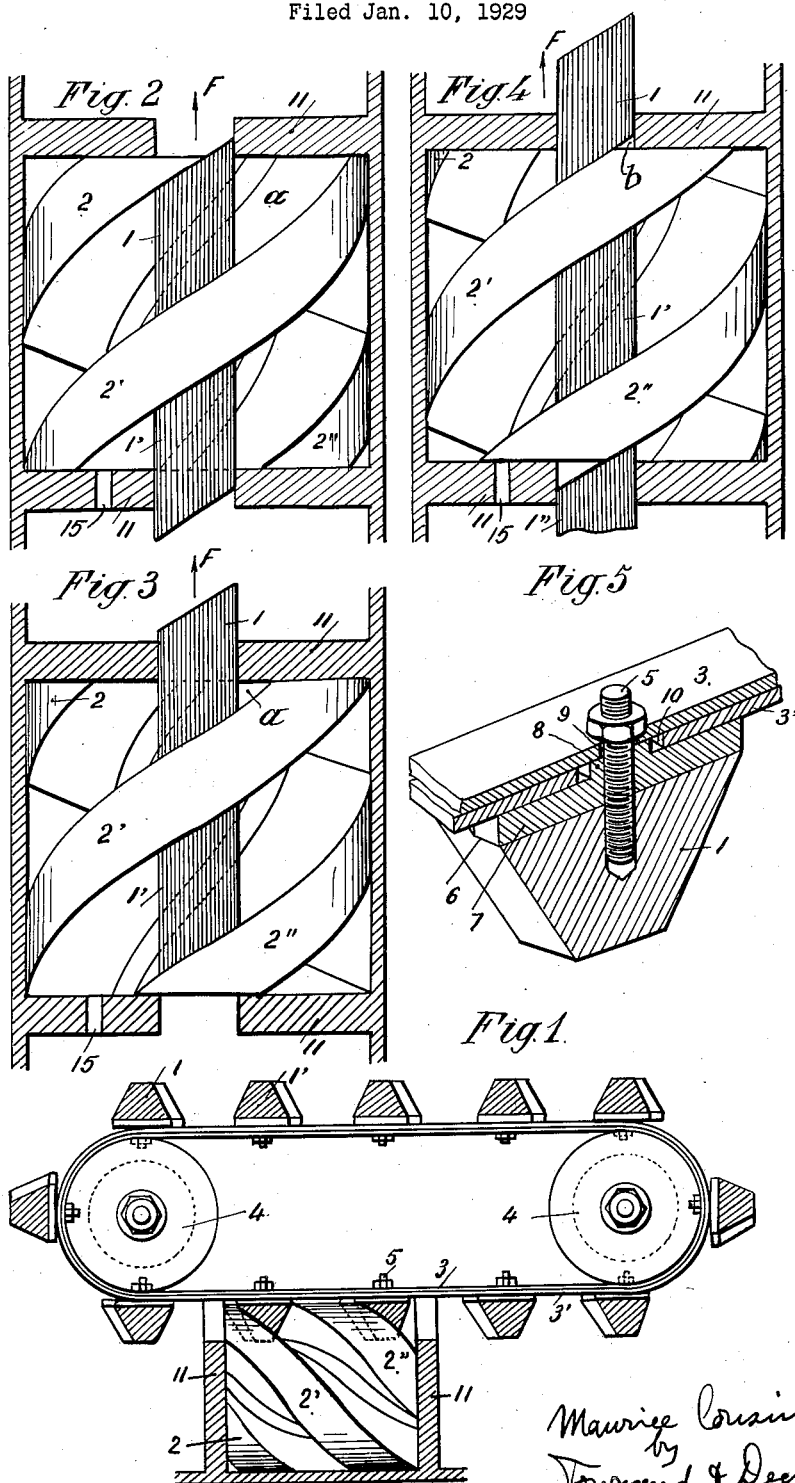

Patented July 31, 1934

1,968,439

UNITED STATES PATENT OFFICE 1,968,439

GEARING

Maurice Cousin, Paris, France

Application January 10, 1929, Serial No. 331,626
In France January 17, 1928

3 Claims. (Cl. 74—7)

The object of this invention is to provide gearing comprising an endless belt equipped with teeth that mesh with threads of a worm gear. While the invention is primarily intended for use in connection with internal combustion engines, particularly as set forth in my copending application, Serial Number 236,905, filed December 1, 1927, it finds utility as gearing for more or less general use.

With the above and other objects in view, as will be brought out hereinafter, reference will be had to the accompanying drawing forming a part of this specification, and wherein:—

Fig. 1 is a sectional view showing the constitution of the chain of projecting elements by means of a flexible band.

Figs. 2, 3 and 4 are diagrams illustrating different positions of the movable elements in the case of triangular threads.

Fig. 5 shows a sectional detail of the way the projecting elements are mounted on the flexible band.

Referring to Figs. 1 and 5, the projecting elements 1 are mounted at regular intervals corresponding to the pitch of the thread of a screw 2, on a flexible band composed, for instance, of two superposed strips 3, 3'. The guiding of the band is effected in the curved parts by means of guide wheels 4.

Assembly of the projecting elements 1 is effected preferably by means of a securing bolt 5 and, for compensating for the differences in length of the two strips, I may establish the assembly by providing the projecting element with a longitudinal passage 6 in which is fitted an interstitial blade 7 provided, for instance, with a boss 8 permitting, during tightening of the bolt 5, to block the internal strip 3, pierced with an orifice 9 corresponding to the diameter of the bolt 5. The external strip 3' not being immobilized in the arrangement with projecting element 1 is adapted to slide during expenditure of effort and redressing, due to a certain amount of play at 10 of the strip 3' about the boss 8.

According to a further feature of my invention the thread of the screw element 2 and of the projecting element 1 is of triangular shape truncated at the bottom as shown in Fig. 5.

In Figs. 2, 3 and 4, 11 is a casing, 1, 1', 1" the projecting elements of the chain, 2, 2', 2" the screw threads, these elements being movable in the direction indicated by the arrow F. The threads 2, 2', 2" are of triangular section and truncated at the bottom and the projecting elements 1, 1' are of corresponding section.

Obviously the embodiment of my invention disclosed is only given by way of example and other means for compensating for length might be used without departing from the spirit of the invention as comprehended within the scope of the appended claims.

Having described my invention what I claim as new and desire to secure by Letters Patent of the United States of America is:

1. A gear element, comprising an endless member composed of relatively movable superposed unarticulated and flexible strips, teeth mounted on one of said strips and extending through the other, and means mounting the endless member for movement.

2. A gear element, comprising an endless member composed of relatively movable superposed flexible strips, the outer of said strips being provided with longitudinal openings, teeth of greater extent than said openings, means passing through said openings and securing the teeth to the inner of said strips, and means mounting the endless member for movement.

3. A gear element, comprising an endless member composed of relatively shiftable superposed flexible strips, the outer of said strips having openings, teeth of greater extent than the openings arranged upon the outer of said strips and secured to the inner of said strips through the openings, means spacing the teeth from the inner strip a distance slightly greater than the thickness of the outer strip, and means mounting the endless member for movement.

MAURICE COUSIN.